United States Patent [19]

Kimmel et al.

[11] 3,717,006
[45] Feb. 20, 1973

[54] TRANSIT HANDLING SYSTEM FOR VOLATILE FLUIDS

[75] Inventors: Cleve C. Kimmel, Torrance; John H. Moll, Hawthorne, both of Calif.

[73] Assignee: Parker-Hannifin, Cleveland, Ohio

[22] Filed: May 27, 1971

[21] Appl. No.: 147,614

Related U.S. Application Data

[63] Continuation of Ser. No. 844,971, July 25, 1969, abandoned.

[52] U.S. Cl. ............................... 62/48, 62/54, 62/55
[51] Int. Cl. ............................................. F17c 11/00
[58] Field of Search .......................... 62/48, 54, 55

[56] References Cited

UNITED STATES PATENTS

| | | | |
|---|---|---|---|
| 2,951,348 | 9/1960 | Loveday et al. | 62/55 |
| 3,030,780 | 4/1962 | Loveday | 62/54 |
| 2,964,918 | 12/1960 | Hansen et al. | 62/55 |
| 2,907,177 | 10/1959 | Daley et al. | 62/55 |
| 2,966,040 | 12/1960 | Henry | 62/55 |

*Primary Examiner*—William F. O'Dea
*Assistant Examiner*—P. D. Ferguson
*Attorney*—Oberlin, Maky, Donnelly and Renner

[57] ABSTRACT

A portable system for refilling aircraft dewars with liquid nitrogen for fuel tank inerting and with liquid oxygen for emergency breathing. In the case of filling of the oxygen dewar, the system has a filling sub-system which removes moisture and particulate matter from the fluid stream, a saturating sub-system which controls the vapor-liquid equilibrium temperature of the incoming fluid from the filling sub-system, a storage sub-system of which the liquid nitrogen storage portion provides a heat sink for the oxygen to eliminate evaporation losses and to maintain the liquid oxygen at two different temperatures, and a delivery sub-system which transfers the stored liquid into the aircraft dewar at any preselected condition between the two storage temperatures.

13 Claims, 2 Drawing Figures

PATENTED FEB 20 1973
3,717,006
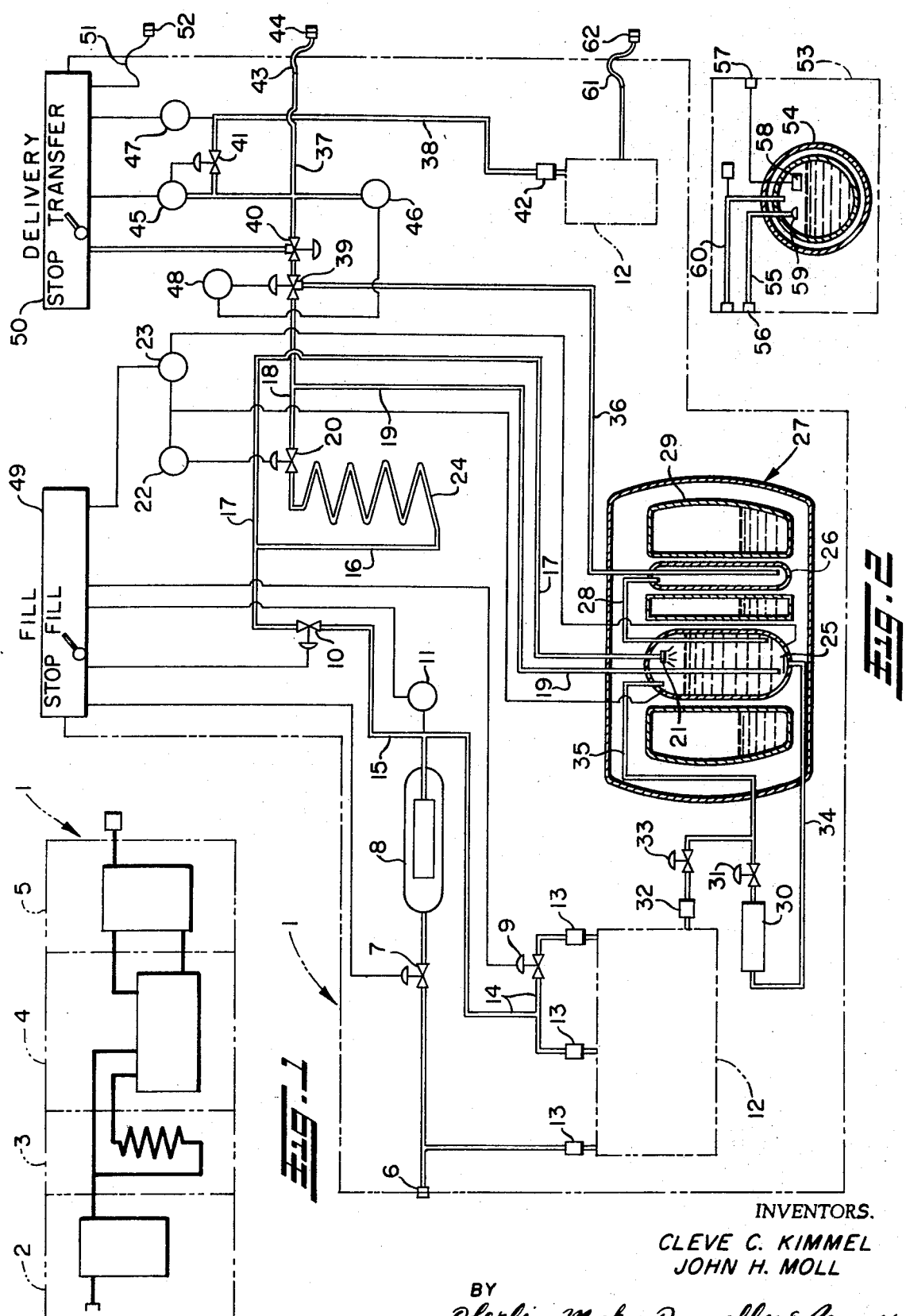
INVENTORS.
CLEVE C. KIMMEL
JOHN H. MOLL
BY *Oberlin, Maky, Donnelly & Renner*
ATTORNEYS

TRANSIT HANDLING SYSTEM FOR VOLATILE FLUIDS

This is a continuation of U.S. Pat. application Ser. No. 844,971, filed July 25, 1969, and now abandoned.

BACKGROUND OF THE INVENTION

Oxygen breathing systems for aircraft most generally comprise a plurality of oxygen bottles or cylinders in which the oxygen is stored at a high pressure, viz, 1,850 to 2,200 psi which presents known hazards in recharging the bottles and which require careful and specialized ground handling procedures and practices that are costly to aircraft operators.

Aircraft have been equipped heretofore with liquid oxygen breathing systems wherein the oxygen is stored at a temperature level higher than its atmospheric pressure boiling point. However, in known liquid oxygen systems refilling of the aircraft oxygen dewars entails evaporation losses which create potential fire hazards and moreover, the refilling procedure from a ground supply unit has been cumbersome and time-consuming.

Aircraft are also now being equipped with liquid nitrogen inerting systems for fire prevention and extinguishment, and to enable periodic refilling of the liquid nitrogen dewar on the aircraft with minimum losses reference may be had to the co-pending application of Cleve C. Kimmel and John H. Moll, entitled, "Transfer of Cryogenic Liquids," Ser. No. 819,681, filed Apr. 28, 1969. The system of said co-pending application is characterized in that only a single fluid connection is made between the liquid nitrogen supply container and the aircraft nitrogen dewar without venting the latter so that the filling operation may be achieved without gas or liquid loss by evaporation or overflow.

SUMMARY OF THE INVENTION

Contrary to the foregoing, the present system combines the oxygen and nitrogen liquid supply systems so that the liquid nitrogen may be employed as a refrigerant for the liquid oxygen whereby the latter may be safely and economically transferred to the aircraft dewar. As in the case of the aforesaid co-pending application Ser. No. 819,681, the transfer of liquid oxygen from a ground supply unit into the aircraft dewar involves only a single fluid connection between the ground supply unit and the disconnect coupling on the aircraft which leads into the oxygen dewar.

In filling the ground supply unit which comprises a filling sub-system; a saturation control sub-system; a storage sub-system; and a delivery sub-system, the initial vapor (e.g., oxygen) coming into the filling sub-system passes through a condensate trap and filter to remove any moisture that may be present and exhausts to ambient pressure through a vapor disposal unit which does not constitute any part of this invention. When the volatile fluid has cooled the lines sufficiently to permit liquid flow, the circuit terminates the exhaust flow and diverts the incoming liquid flow from the filling sub-system into the saturation control sub-system.

In the saturation control sub-system, the temperature of the incoming liquid is stabilized at a preselected level above the normal boiling temperature, and the incoming liquid is discharged therefrom into a storage tank, the incoming fluid flow being partially diverted by a thermal control circuit so that it passes through a saturating pressure heat exchange assembly and is remixed in the storage tank with the incoming fluid.

Thereafter, the storage tank in the storage sub-system is filled without thermal loss, the cold incoming fluid being ducted into the top of the storage tank through a spray header and the saturated fluid being ducted into the bottom of the same tank. The resulting mixing action of these two streams produces a common pressure in the vapor space of the storage tank. The amount of fluid from each stream entering the tank is regulated by a pressure controller which is set to maintain the desired saturation level for the operating conditions required. The storage tank is made in two parts, one of which is thermally isolated from the liquid nitrogen storage tank, and the other of which is in thermal equilibrium with the liquid nitrogen storage tank whereby the liquid therein is sub-cooled to nitrogen temperature. The two parts of the storage tank are in fluid communication with each other so that the sub-cooled part is kept full by transfer of liquid from the saturated part.

Finally, the delivery sub-system is arranged so that when connected to the aircraft dewar, the residual fluid in the latter is permitted to depressurize so as to pre-chill the lines in the delivery sub-system and to dispose of the vapors in a disposal system. Thereafter, a thermal sensor switches the delivery sub-system from pre-chill to fill whereupon the liquid from the two parts of the storage tank is mixed to supply liquid at desired saturation level into the aircraft dewar. A level sensing device in the aircraft dewar then shuts off the delivery sub-system, and upon disconnection the residual fluid recondenses in the storage sub-system.

Other objects and advantages of the present invention will appear hereinafter.

BRIEF DESCRIPTION OF THE DRAWING

FIG. 1 is a schematic drawing of a system constituting the present invention; and FIG. 2 is a detailed schematic drawing illustrating the various controls to achieve the desired ends of the invention.

DETAILED DESCRIPTION OF THE INVENTION

As shown in FIGS. 1 and 2, the ground supply unit 1 (a cart or trailer) comprises a filling sub-system 2; a saturation sub-system 3; a storage sub-system 4; and a delivery sub-system 5.

The filling sub-system 2 comprises a fill connection 6, a fill shut-off valve 7, a moisture trap and filter assembly 8, a fill diverter valve 9, a flow control valve 10, a thermal sensor 11, a disposal system 12, relief valves 13 and line ducting 14 and 15.

The saturation fill sub-system 3 comprises line ducting 16, 17, 18, and 19, a mixing valve 20, a spray bar header 21, a pressure controller 22, a differential liquid level pressure sensor 23 and a heat exchanger 24.

The storage sub-system 4 comprises a saturated liquid (e.g., oxygen) supply container 25, a sub-cooled liquid (e.g., oxygen) supply container 26, a nitrogen servicer assembly 27, a cross-flow duct 28, a liquid nitrogen storage tank 29, a heat exchanger 30, a pressure regulator 31, a relief valve 32, a shut-off vent valve 33 and ducting 34 and 35. Finally, the delivery sub-system 5 comprises withdrawal ducting 36, 37, and 38, a mixing valve 39, a shut-off valve 40, a vent flow control valve 41, a relief valve 42 that ducts to the vapor disposal system 12, a flexible line connection 43, a self-sealing disconnect coupling 44, a pressure controller 45, thermal sensors 46 and 47, and a thermal controller 48. The system also has control circuit units 49 and 50, shut-off electrical lead 51, and electrical disconnect 52.

The aircraft 53 has therein an aircraft dewar 54 having a fill line 55 and disconnect assembly 56 connected to the supply unit 1 via the flexible line 43 and coupling 44.

Normally, the delivery of oxygen proceeds as follows from the ground supply unit 1 into the aircraft dewar 56. The disconnect couplings 44 and 56 are mated for fluid transfer and electrical disconnects 57 and 52 are mated for liquid level shut-off control by the level sensor 58. Pressure in the aircraft dewar 54 is discharged through line sections 43, 37 to the vent flow control valve 41 and exits out line section 38. This action pre-chills the fill line assembly so that volatile fluid can flow from the apparatus 1 to the aircraft dewar 54. When the temperature at 47 reaches the preset level, valve 41 is closed and the flow shut-off valve 40 is opened. Liquid (e.g., oxygen) from the storage tank 25 flows through line 19 to the mixing valve 39. The amount of oxygen flowing from sub-cooled storage tank 26 through duct 36 to the mixing valve 39 is regulated by the thermal control 48 sensing temperature at the point 46. The mixed liquid is ducted into the aircraft dewar 54 through the pre-chilled line 37, 43, 55 and is sprayed into the vapor space of dewar 54 through the spray head 59 to maintain the pressure therein at the desired level. When the liquid level reaches the desired level, the level sensor 58 (connected to the control unit 50 through disconnect 57 and 52), signals the control unit 50 to terminate the filling operation. The valve 40 is closed and the operator disengages the fill disconnect 44. The pressure sensor 45 opens the valve 41 and the pressure in the ducts 43 and 37 are vented through the duct 38 into the disposal system 12.

For delivery of oxygen to an aircraft dewar 54 that does not contain residual fluid, a second connection is made to the vent line assembly 60 and a flexible duct 61 and disconnect 62 on the ground supply unit 1. This allows the fluid in the supply unit 1 to flow into the dewar 54. As soon as the residual heat in the ducting 37, 43, 55 and the dewar 54 has been removed by the incoming fluid from storage tanks 25 and 26, the vent line disconnect 62 is removed and filling proceeds as for the normal fill described above.

Servicing of the ground supply unit is performed as follows. First volatile fluid from a supply source (not shown) is connected to the disconnect 6 and the control unit 49 is positioned to "FILL." This action opens the fill valve 7 and the fill vent valve 9. Gas from the supply source passes through duct 14 and relief valves 13 into the vapor disposal unit 12, removing residual moisture in the filling sub-system 2 as it passes through. When the temperature of the fluid decreases to the preset value of temperature sensor 11, valve 10 is opened and valve 9 is closed. Fluid now passes through ducts 15 and 17 and spray head 21 into the storage tank 25. A pressure controller 22 monitors the vapor space pressure in tank 25, and if the pressure is lower than the set value, valve 20 is opened and fluid passes through duct 16 and heat exchanger 24 into the tank 25 via ducts 18 and 19. This warmer fluid mixes with the fluid already present in tank 25 and increases its total temperature and thus its pressure is mixed with the incoming fluid pressure at the spray head 21. Simultaneously with the flow increase through duct 19, the flow through duct 17 is decreased due to the lowering of the total pressure available resulting from these dual flows. Because storage tank 25 is thermally insulated from the nitrogen in the apparatus 27, a high pressure can be maintained. Because the storage tank 26 is in direct thermal contact with the nitrogen tank 29, it will be chilled to that temperature and the fluid vapor in tank 26 will condense under this pressure head imposed by tank 25. Thus, fluid will flow by cascading into tank 26 from tank 25 filling it completely. When the liquid reaches the predetermined level noted by the sensor 23, the control unit 49 will terminate the fill and disconnect at 6 can be made from the supply source. Residual pressures in line 15 is vented into the disposal system 12.

The desired saturated pressure in tank 25 is maintained by a heat exchanger 30. The fluid passing from the tank 25 through duct 34 is controlled by a regulator 31, the warmed fluid entering the top of the tank 25 through the duct 35 and mixes with the fluid therein to balance the low heat loss from the storage tank 25 into the nitrogen supply tank 29 for fuel tank inerting servicing and other uses. The amount of fluid from each stream 17 and 18 entering the tank 25 is regulated by a pressure control 22 set to maintain the desired saturation level. The tank 25 is thermally isolated from the liquid nitrogen supply tank 29 so that the rate of heat transfer from the oxygen to the nitrogen is consistent with the heat gain requirements allowable for the liquid nitrogen. This tank 25 is physically separated from the nitrogen tank 29 to prevent the possibility of an oxygen-nitrogen intermix. The second, and smaller capacity, oxygen tank 26 is in thermal equilibrium with the nitrogen supply tank 29. Again, this tank 26 is physically separate from the nitrogen tank 29 to prevent an oxygen-nitrogen intermix. This sub-cooled tank 26 is kept full by oxygen transfer from the saturated tank 25 through duct 28. The warmer oxygen transferred over to replace usages is cooled to the liquid nitrogen temperature. The pressure in the vapor space of the saturated tank 25 is imposed on the liquid in both tanks 25 and 26. The reason for having two tanks 25 and 26 is to provide a thermal balance during discharge of the fluid into the aircraft dewar 54. Because the operating thermal energy and respective pressure levels between the two fluids (oxygen and nitrogen) is not equal, a pressure makeup circuit is provided to maintain the desired levels necessary for transfer and to compensate for the heat loss from the oxygen to the nitrogen.

We, therefore particularly point out and distinctly claim as our invention:

1. A system for refilling an aircraft dewar with a volatile liquid for use in a gaseous form, said system comprising storage dewars and containing volatile liquid in fluid communication with each other; means to maintain the liquid within the storage dewars at different temperatures, the liquid which is warmer being sufficiently saturated to have a vapor pressure capable of maintaining the other container in a filled condition; mixing valve means; delivery line means from said dewars through which said liquid from both containers is delivered under the influence of such vapor pressure through said mixing valve means to the aircraft dewar, said mixing valve means being adapted to proportion and mix the warmer and colder liquid so that the liquid ultimately dispensed has a predetermined temperature between the temperatures of said warmer and colder liquid.

2. The system of claim 1 wherein said means to maintain said storage dewars at different temperatures comprises another storage dewar containing another liquid of lower temperature than said colder liquid, said colder liquid being in thermal equilibrium with said another liquid and said warmer liquid being thermally isolated from said another liquid.

3. The system of claim 1 wherein said delivery line has a temperature sensing device therein operative to control said mixing valve means.

4. The system of claim 1 wherein said delivery line has a vent flow control valve therein which, when opened, permits reverse flow of vapor in said delivery line from the aircraft dewar to pre-chill said delivery line.

5. The system of claim 4 wherein said system has a vent line connection with the vapor space of the aircraft dewar whereby, when there is no residual liquid in the aircraft dewar, liquid flowing in said delivery line into the aircraft dewar pre-chills said delivery line.

6. A system for refilling an aircraft dewar with a volatile liquid for subsequent use in gaseous form, said system comprising a volatile liquid contained within a supply source; a filling sub-system having an inlet for connection with such liquid supply source and an outlet; a saturation sub-system connected to said outlet and having heat exchange means predeterminedly to heat such liquid for saturation thereof; a storage sub-system having at least one storage dewar to receive such liquid from said saturation sub-system, said storage sub-system having means substantially to maintain the predetermined vapor pressure of such saturated liquid while preserving contents of the storage dewar; and a delivery sub-system having delivery line means through which liquid from said storage dewar is dispensed to an aircraft dewar; said filling sub-system having a flow control valve adjacent said outlet, a vent valve upstream of said flow control valve through which such liquid from the supply source flows to prechill said filling sub-system while said flow control valve is closed, and a control unit including a temperature sensing means which opens said flow control valve and closes said vent valve when said filling sub-system has been pre-chilled to desired temperature.

7. The system of claim 6 wherein said filling sub-system has a moisture trap and filter assembly therein located upstream of said valves.

8. A system for refilling an aircraft dewar with a volatile liquid for subsequent use in gaseous form, said system comprising a volatile liquid contained within a supply source; a filling sub-system having an inlet for connection with such liquid supply source and an outlet; a saturation sub-system connected to said outlet and having heat exchange means predeterminedly to heat such liquid for saturation thereof; a storage sub-system having at least one storage dewar to receive such liquid from said saturation sub-system, said storage sub-system having means substantially to maintain the predetermined vapor pressure of such saturated liquid while preserving contents of the storage dewar; and a delivery sub-system having delivery line means through which liquid from said storage dewar is dispensed to an aircraft dewar; said saturation sub-system comprising a first conduit means having spray means operative to spray such liquid received directly from said filling sub-system into said storage dewar, and a second conduit means adapted partially to divert liquid flow from said first conduit, said second conduit means having a heat exchanger and a thermally responsive valve means operative to conduct warmed liquid into said storage dewar to elevate the vapor pressure in the latter to a predetermined value.

9. The system of claim 8 wherein said second conduit means conducts the warmed liquid into said storage dewar beneath the liquid level therein, and said first conduit means sprays the liquid into said storage dewar in the vapor space therein.

10. A system for refilling an aircraft dewar with a volatile liquid for subsequent use in gaseous form, said system comprising a volatile liquid contained within a supply source; a filling sub-system having an inlet for connection with such liquid supply source and an outlet; a saturation sub-system connected to said outlet and having heat exchange means predeterminedly to heat such liquid for saturation thereof; a storage sub-system having at least one storage dewar to receive such liquid from said saturation sub-system, said storage sub-system having means substantially to maintain the predetermined vapor pressure of such saturated liquid while preserving contents of the storage dewar; and a delivery sub-system having delivery line means through which liquid from said storage dewar is dispensed to an aircraft dewar; said storage sub-system comprising, in combination, two storage dewars in fluid communication with each other, one of said dewars being in receiving communication with said saturation sub-system, and means to maintain the liquid in said storage dewars at different temperatures, said receiving dewar liquid being warmer than the liquid in said other dewar and being sufficiently saturated to have a vapor pressure capable of maintaining the other dewar in a filled condition; and mixing valve means in said delivery sub-system to proportion the flow of liquid from the respective storage dewars to deliver such liquid to said delivery line at a desired temperature between the temperatures of the liquid in said storage dewars.

11. The system of claim 10 wherein said storage sub-system comprises another storage dewar containing another liquid of lower temperature than said colder liquid, said colder liquid being in thermal equilibrium with said another liquid and said warmer liquid being thermally isolated from said another liquid.

12. The system of claim 10 wherein said means to maintain vapor pressure within said storage sub-system comprises a second heat exchanger and a pressure regulator operative to heat liquid from said storage dewar and to return it into the vapor space from said receiving storage dewar to predeterminedly pressurize said storage dewar to compensate for heat loss in said warmer liquid.

13. A system for refilling an aircraft dewar with a volatile liquid for subsequent use in gaseous form, said system comprising a volatile liquid contained within a supply source; a filling sub-system having an inlet for connection with such liquid supply source and an outlet; a saturation sub-system connected to said outlet and having heat exchange means predeterminedly to heat such liquid for saturation thereof; a storage sub-system having at least one storage dewar to receive such liquid from said saturation sub-system, said storage sub-system having means substantially to maintain the predetermined vapor pressure of such saturated liquid while preserving contents of the storage dewar; and a delivery sub-system having delivery line means through which liquid from said storage dewar is dispensed to an aircraft dewar; said delivery sub-system including a disposal means and a removable vent line connected between an aircraft dewar and said disposal means, whereby in the absence of residual fluid in the aircraft dewar, fluid may flow through the delivery line into said aircraft dewar with excess vapor pressure removed through the vent line until such delivery line and dewar have been predeterminedly pre-cooled.

* * * * *